United States Patent
Fischer et al.

(10) Patent No.: US 9,495,503 B2
(45) Date of Patent: Nov. 15, 2016

(54) METHOD AND APPARATUS TO ENABLE A SELECTIVE PUSH PROCESS DURING MANUFACTURING TO IMPROVE PERFORMANCE OF A SELECTED CIRCUIT OF AN INTEGRATED CIRCUIT

(75) Inventors: Jeffrey Herbert Fischer, Raleigh, NC (US); Manish Garg, Morrisville, NC (US); Zhongze Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 13/372,160

(22) Filed: Feb. 13, 2012

(65) Prior Publication Data

US 2012/0256682 A1   Oct. 11, 2012

Related U.S. Application Data

(60) Provisional application No. 61/472,439, filed on Apr. 6, 2011.

(51) Int. Cl.
*G06F 17/50* (2006.01)

(52) U.S. Cl.
CPC ....... *G06F 17/5081* (2013.01); *G06F 2217/12* (2013.01); *Y02P 90/265* (2015.11)

(58) Field of Classification Search
CPC .............. G06F 17/50; G06F 17/5045; G06F 17/5068; G06F 17/5072; G06F 2217/12
USPC ........ 716/100, 106–113, 118–120, 132–134, 716/139
See application file for complete search history.

(56) References Cited

U.S. PATENT DOCUMENTS

| | | |
|---|---|---|
| 5,774,367 A | 6/1998 | Reyes et al. |
| 7,010,763 B2 | 3/2006 | Hathaway et al. |
| 7,281,230 B2 | 10/2007 | Chung et al. |
| 7,366,997 B1 | 4/2008 | Rahmat et al. |
| 7,415,687 B2 * | 8/2008 | Lahner et al. ............... 716/122 |
| 7,519,941 B2 | 4/2009 | Bueti et al. |
| 7,627,836 B2 | 12/2009 | Culp et al. |
| 7,716,618 B2 | 5/2010 | Ferrari et al. |

(Continued)

OTHER PUBLICATIONS

Choudhury, et al., "Masking Timing Errors on Speed-Paths in Logic Circuits", Design, Automation and Test in Europe Conference and Exhibition, 2009, 6 pgs.

(Continued)

*Primary Examiner* — Paul Dihn
(74) *Attorney, Agent, or Firm* — Michelle S. Gallardo

(57) ABSTRACT

Provided are methods and apparatus for enabling selective push processing during design and fabrication of an integrated circuit to improve performance of selected circuits of the integrated circuit. An exemplary method includes identifying a critical portion of an integrated circuit layout that defines a functional element having a critical operating frequency requirement and designing a subcircuit in the critical portion to enable performing a speed push process to increase performance of the subcircuit. The method can also include identifying at least one of a power supply node, a clock supply node, and an interface node at a boundary between the critical portion and a portion of the integrated circuit that is outside of the critical portion. The critical portion can be designed with a power domain that is independent of the portion of the integrated circuit that is outside of the critical portion.

4 Claims, 4 Drawing Sheets

(56) References Cited

U.S. PATENT DOCUMENTS

| | | | |
|---|---|---|---|
| 7,811,876 | B2 | 10/2010 | Scott et al. |
| 7,882,463 | B2 | 2/2011 | Heng et al. |
| 8,468,482 | B1* | 6/2013 | Pack et al. ............... 716/110 |
| 2002/0026626 | A1* | 2/2002 | Randall et al. ............. 716/19 |
| 2002/0188920 | A1* | 12/2002 | Lampaert et al. ........... 716/10 |
| 2004/0250229 | A1* | 12/2004 | Tran ........................ 716/10 |
| 2005/0273742 | A1* | 12/2005 | Issa et al. ................... 716/6 |
| 2005/0280437 | A1* | 12/2005 | Lewis et al. ................ 326/38 |
| 2006/0214721 | A1* | 9/2006 | Ikeda et al. ............... 327/365 |
| 2007/0044059 | A1* | 2/2007 | Martin et al. .............. 716/11 |
| 2007/0283307 | A1* | 12/2007 | Arizono ..................... 716/10 |
| 2010/0050144 | A1 | 2/2010 | Zahn |
| 2010/0277201 | A1* | 11/2010 | Wortman et al. ........... 326/38 |
| 2010/0287521 | A1* | 11/2010 | Sahouria et al. ........... 716/55 |
| 2010/0308415 | A1 | 12/2010 | Herberholz et al. |
| 2012/0017192 | A1 | 1/2012 | Jou et al. |
| 2012/0233576 | A1 | 9/2012 | Barrows et al. |
| 2012/0272201 | A1* | 10/2012 | Lai et al. .................. 716/112 |
| 2014/0181761 | A1 | 6/2014 | Fischer et al. |

OTHER PUBLICATIONS

Bai R., et al., "An implementation of a, 32-bit ARM processor using dual power, supplies and dual threshold voltages," VLSI, 2003 Proceedings IEEE computer, Society Annual Symposium on Feb. 20-21, 2003, Piscataway, NJ, USA, IEEE, Feb. 20, 2003, pp. 149-154, XP010629447, ISBN: 978-0-7695-1904-3 p. 149-p. 152.

Kao J., et al., "Subthreshold leakage modeling and reduction techniques", IEEE/ACM International Conference on Computer Aided Design (ICCAD) 2002 IEEE/ACM Digest of Technical Papers, San Jose, CA, Nov. 10-14, 2002; [IEEE/ACM International Conference on Computer-Aided Design], New York, NY: IEEE, US, Nov. 10, 2002, pp. 141-148, XP010624638, ISBN: 978-0-7803-7607-6 p. 144-p. 145.

Karnik T., et al., "Total power optimization by simultaneous dual-Vt allocation and device sizing in high performance microprocessors," DAC, Jan. 1, 2002, p. 486, XP055121343, ISSN: 0738-100X, DOI: 10.1145/513918.514042, pp. 487-490.

Nguyen D., et al., "Minimization of dynamic ana static power througn joint assignment of threshold voltages and sizing optimization," Proceedings of the 2003 International Symposium on Low Power Electronics and Design (ISLPED), Seoul, Korea, Aug. 25-27, 2003; [International Symposium on Lower Power Elctronics and Design], New York, NY: ACM, US, Aug. 25, 2003, pp. 158-163, XP010658605, ISBN: 978-1-58113-682-1 p. 158-p. 160.

Wei L., et al., "Design and optimization of low voltage high performance dual threshold CMOS circuits," Design Automation Conference, 1998 Proceedings San Francisco, CA, USA Jun. 15-19, 1998, New York, NY, USA,IEEE, US, Jun. 19, 1998, pp. 489-494, XP032100816, ISBN: 978-0-89791-964-7 p. 491-p.493.

* cited by examiner

METHOD AND APPARATUS TO ENABLE A SELECTIVE PUSH PROCESS DURING MANUFACTURING TO IMPROVE PERFORMANCE OF A SELECTED CIRCUIT OF AN INTEGRATED CIRCUIT

CLAIM OF PRIORITY UNDER 35 U.S.C. §119

The present Application for Patent claims priority to U.S. Provisional Application No. 61/472,439 entitled "A DESIGN METHOD TO ENABLE SELECTIVE PROCESS PUSH DURING MANUFACTURING TO IMPROVE PERFORMANCE OF SELECTED CIRCUITS OF A SYSTEM-ON-A-CHIP INTEGRATED CIRCUIT," filed Apr. 6, 2011, and assigned to the assignee hereof and hereby expressly incorporated by reference herein in its entirety.

FIELD OF DISCLOSURE

This disclosure relates generally to electronics, and more specifically, but not exclusively, to apparatus and methods for enabling selective push processing during manufacturing to improve performance of a selected circuit of an integrated circuit.

BACKGROUND

In mobile systems-on-a-chip (SOC), chip performance is becoming increasingly important to benchmark against competition. The traditional approach is to design an integrated circuit using transistor models and simulate it at certain voltage, temperature, and process corners to ensure the integrated circuit meets certain performance criteria. Once design is complete, the integrated circuit is manufactured according to the transistor specifications used by the design. Thus, the performance of the integrated circuit is fixed at the design operating conditions. However, customers always demand a higher performance product. Thus, it is highly desirable to produce an integrated circuit that provides higher performance than a competitor's product, to differentiate the integrated circuit from the competitor's product. Conventional methods dictate that integrated circuit improvement requires redesigning the entire integrated circuit. However, redesigning the entire integrated circuit requires very high engineering costs and long cycle times. What is needed are integrated circuit design and fabrication techniques that allow for future performance enhancement of portions of the integrated circuit without sacrificing standby (i.e., sleep-mode) leakage, and without requiring redesign of the entire integrated circuit.

Accordingly, there are long-felt industry needs for methods and apparatus that mitigate problems of conventional methods and apparatus, including a design method to enable selective push processing push during manufacturing to improve performance of selected circuits of a system-on-a-chip integrated circuit.

SUMMARY

This summary provides a basic understanding of some aspects of the present teachings. This summary is not exhaustive in detail, and is neither intended to identify all critical features, nor intended to limit the scope of the claims.

Exemplary methods and apparatus for designing an integrated circuit are provided. The method includes identifying a critical portion of an integrated circuit layout that defines a functional element having a critical operating frequency requirement and designing a subcircuit in the critical portion to enable performing a speed push process to increase performance of the subcircuit. In another aspect, the method can further include identifying at least one of a power supply node, a clock supply node, and an interface node at a boundary between the critical portion and a portion of the integrated circuit that is outside of the critical portion. The method can further include designing the critical portion with a power domain that is independent of the portion of the integrated circuit that is outside of the critical portion. Also, the method can further include designing the critical portion with a clock domain that is independent of the portion of the integrated circuit that is outside of the critical portion. The method can further include designing an interface between the critical portion and the portion of the integrated circuit that is outside of the critical portion as an asynchronous interface and/or capable of operating with at least two different clock ratios, each clock ratio being associated with a different circuit to which the interface performs an interface function. In an example, the method can further include designing a marker layer to identify the critical portion. A design rule check can be performed to ensure that the marker layer meets manufacturing requirements. The method can further include designing the integrated circuit to identify a type of speed push processing that is to be applied during fabrication. The method can further include performing, during fabrication, a performance boosting process on selected transistors within the critical portion.

In a further example, provided is a non-transitory computer-readable medium, comprising instructions stored thereon that, if executed by a processor, cause the processor to execute at least a part of the aforementioned method. The non-transitory computer-readable medium can be integrated with a device, such as a mobile device, music player, video player, entertainment unit, navigation device, communications device, personal digital assistant (PDA), fixed location data unit, and/or a computer.

In another example, provided is a lithographic device configured to design at least a part of an integrated circuit. The lithographic device includes means for identifying a critical portion of an integrated circuit that defines a functional element having a critical operating frequency requirement and means for designing a subcircuit in the critical portion to enable performing a speed push process to increase performance of the subcircuit. The lithographic device can also include means for identifying at least one of a power supply node, a clock supply node, and an interface node at a boundary between the critical portion and a portion of the integrated circuit that is outside of the critical portion. In an aspect, the lithographic device can also include means for designing the critical portion with a power domain that is independent of the portion of the integrated circuit that is outside of the critical portion. Also, the lithographic device can also include means for designing the critical portion with a clock domain that is independent of the portion of the integrated circuit that is outside of the critical portion. The lithographic device can also include means for designing an interface between the critical portion and the portion of the integrated circuit that is outside of the critical portion as an asynchronous interface and/or capable of operating with at least two different clock ratios, each clock ratio being associated with a different circuit to which the interface performs an interface function. Further, the lithographic device can also include means for designing a marker layer to identify the critical portion. The lithographic device can also include means for performing a design rule check to ensure that the marker layer meets manufacturing requirements. In an example, the lithographic device can also include means for designing the integrated circuit to identify a type of speed push processing that is to be applied during fabrication. The lithographic device can also include means for performing, during fabrication, a performance boosting process on selected transistors within the critical portion.

At least a part of the lithographic device can be integrated in a semiconductor die. Further, at least a part of the apparatus can be integrated with a device, such as a mobile device, a set top box, music player, video player, entertainment unit, navigation device, communications device, personal digital assistant (PDA), fixed location data unit, and/or a computer. In a further example, provided is a non-transitory computer-readable medium, comprising instructions stored thereon that, if executed by a lithographic device, cause the lithographic device to fabricate at least a part of the apparatus.

In another example, provided is an integrated circuit configured to enable a push process. The integrated circuit includes a critical portion of the integrated circuit layout to which a speed push process improves frequency and a marker layer comprising the critical portion. The integrated circuit can include a tangible marking indicating a type of speed push processing that is to be applied to the integrated circuit during fabrication of the integrated circuit.

At least a part of the apparatus can be integrated in a semiconductor die. Further, at least a part of the apparatus can be integrated with a device, such as a mobile device, a set top box, music player, video player, entertainment unit, navigation device, communications device, personal digital assistant (PDA), fixed location data unit, and/or a computer. In a further example, provided is a non-transitory computer-readable medium, comprising instructions stored thereon that, if executed by a lithographic device, cause the lithographic device to fabricate at least a part of the apparatus.

The foregoing broadly outlines some of the features and technical advantages of the present teachings in order that the detailed description and figures can be better understood. Additional features and advantages are also described in the detailed description. The conception and disclosed embodiments can be readily utilized as a basis for modifying or designing other structures for carrying out the same purposes of the present teachings. Such equivalent constructions do not depart from the technology of the teachings as set forth in the claims. The novel features that are characteristic of the teachings, together with further objects and advantages, are better understood from the detailed description and the accompanying figures. Each of the figures is provided for the purpose of illustration and description only, and does not limit the present teachings.

BRIEF DESCRIPTION OF THE DRAWINGS

The accompanying drawings are presented to describe examples of the present teachings, and are not provided as limitations.

Figure 1:
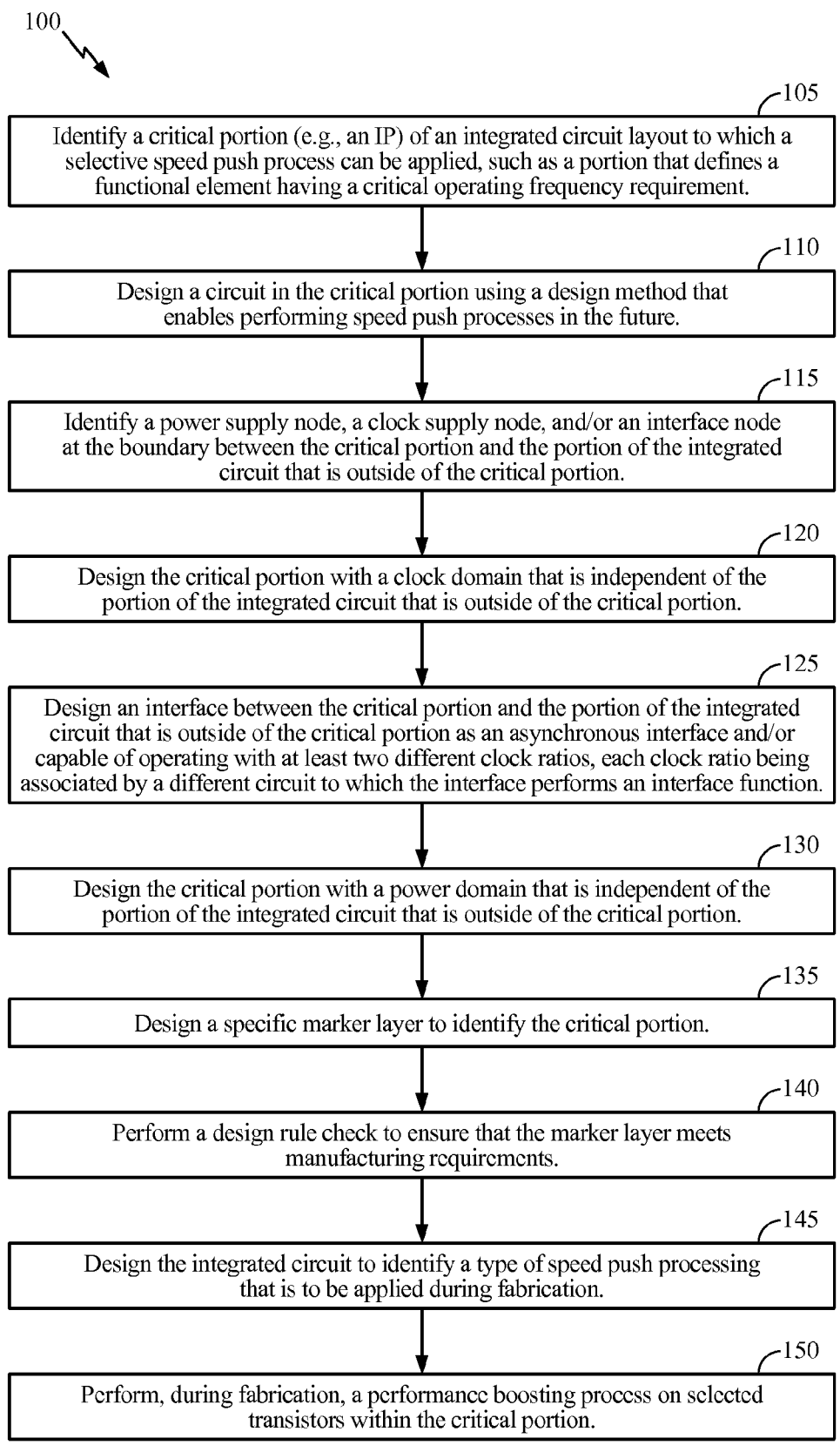
FIG. 1 depicts a flowchart of an exemplary method for designing an integrated circuit.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Examples of the current teachings are disclosed in this application's text and related drawings. The examples advantageously address the long-felt industry needs, as well as other previously unidentified needs, and mitigate shortcomings of the conventional methods and apparatus. Alternate embodiments may be devised without departing from the scope of the invention. Additionally, conventional elements of the current teachings may not be described in detail, or may be omitted, to avoid obscuring aspects of the current teachings.

As used herein, the term "exemplary" means "serving as an example, instance, or illustration." Any embodiment described as "exemplary" is not necessarily to be construed as preferred or advantageous over other embodiments. Likewise, the term "embodiments of the invention" does not require that all embodiments of the invention include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures.

It should be understood that the term "signal" can include any signal such as a data signal, audio signal, video signal, and/or a multimedia signal. Information and signals can be represented using any of a variety of different technologies and techniques. For example, data, instructions, commands, information, signals, bits, symbols, and/or chips that are referenced in this description can be represented by voltages, currents, electromagnetic waves, magnetic fields or particles, optical fields or particles, and any combination thereof.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must precede the second element. Also, unless stated otherwise, a set of elements can comprise one or more elements. In addition, terminology of the form "at least one of: A, B, or C" used in the description or the claims can be interpreted as "A or B or C or any combination of these elements."

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. Further, the terms "comprises," "comprising," "includes," and "including," when used herein, specify a presence of stated features, integers, steps, operations, elements, and/or components, but do not preclude the presence and/or addition of one or more other features, integers, steps, operations, elements, components, and/or groups thereof.

In the following description, certain terminology is used to describe certain features. The term "mobile device"

includes, and is not limited to, a mobile phone, a mobile communication device, a personal digital assistant, a mobile palm-held computer, a wireless device, and/or other types of portable electronic devices typically carried by a person and/or having some form of communication capabilities (e.g., wireless, infrared, short-range radio, etc.).

FIG. 1 depicts a flowchart of an exemplary method 100 for designing an integrated circuit that allows for future performance enhancement of an integrated circuit without requiring redesign of the entire integrated circuit.

In step 105, a critical portion of the integrated circuit layout, to which a selective speed push process can be applied is identified. The critical portion can be a portion of the integrated circuit that defines a functional element having a critical operating frequency requirement, and can determine the speed of the integrated circuit. The critical portion can be a subcircuit of the integrated circuit to which a speed push process improves frequency. Further, the critical portion can be a functional block in the integrated circuit. For example, the critical portion can be a processor core, a graphics processing unit (GPU), an application-specific coprocessor, a digital signal processing (DSP) circuit, and/or a circuit that generally needs a high level of performance to perform an intensive application. If a critical circuit's high performance is dependent upon a second circuit, then that second circuit can also be a part of the critical portion. However, since speed push processing of the integrated circuit can increase current leakage and increase integrated circuit power consumption in some applications, it may be appropriate to keep the critical portion to a minimal size if power consumption is an overriding performance priority. Performance of the critical portion can be selectively improved with a speed push flow process.

A speed push flow process is a combination of circuit design and fabrication techniques that improve the performance (e.g., increase processor speed, reduce slew rate, reduce leakage current when compared to applying a push process to the entire integrated circuit, etc) of the critical portion over different revisions of the integrated circuit during the integrated circuit's lifecycle. A selective speed push flow process can provide benefits such as exploiting improvements in a manufacturing process over the integrated circuit's lifecycle (e.g., improvements in process control, process enhancement, etc.) to improve performance of the critical portion; responding to market dynamics affecting desired integrated circuit performance and power specifications; and/or using a common circuit design for different integrated circuits that require different leakage, performance, and/or yield characteristics. A selective speed push flow process can also accommodate changes to a complex system-on-a-chip integrated circuit that has a long lead time relative to the time between determining the integrated circuit's specifications and a date for shipment to a customer. A selective speed push flow process can also alter a performance characteristic (e.g., a current leakage level) of an integrated circuit, without requiring redesign of the integrated circuit, by selectively varying fabrication parameters for the critical portion of the integrated circuit during the fabrication process.

Identification of the critical portion also identifies non-critical portions of the integrated circuit to which the speed push flow process is not applied. For example, a large memory circuit and a chip control logic circuit may not require high performance, but are always powered, thus these are non-critical portions of the integrated circuit. As a further example, some memory circuits (e.g., a static random access memory (SRAM) cell) are extremely process-sensitive, and thus may need to be excluded from the critical portion. The integrated circuit can be designed such that there are no signal timing faults between a non-speed pushed circuit that interacts with a speed pushed circuit. For example, in case of a memory design, when a SRAM cell is not speed pushed and a circuit coupled to the SRAM is speed pushed, the integrated circuit design is optimized to have sufficient read and write margins.

In an example, a transistor inside the critical portions play the most significant role in determining the performance of integrated circuit. A circuit in the critical portion can be capable of powering down during a sleep mode or another power-saving mode.

In step 110, a circuit in the critical portion is designed using a design method that enables performing a speed push process in the future. A portion of the integrated circuit can be designed with additional timing margin to avoid a timing failure that occurs when speed push processing is applied to the critical portion. For example, a hold time margin at an input of sequential elements can be increased. As a further example, a transistor in the critical portion can be evaluated for proper function post-speed pushing to ensure that the integrated circuit can tolerate a drive ratio change between an n-channel transistor and a p-channel transistor. Also, a dynamic circuit and its power supply can be evaluated to determine and mitigate post-speed push current leakage while providing low noise levels.

In step 115, a power supply node, a clock supply node, and/or an interface node is identified at a boundary between the critical portion and the portion of the integrated circuit that is outside of the critical portion. During the design process, it is important to ensure that portions of the integrated circuit that are outside of the critical portion are compatible with anticipated changes to the critical portion after applying the speed push process. For example, circuit timing and voltage margins should be compatible.

In optional step 120, the critical portion is designed with a clock domain that is independent of the portion of the integrated circuit that is outside of the critical portion.

In optional step 125, an interface between the critical portion and the portion of the integrated circuit that is outside of the critical portion is designed as an asynchronous interface and/or capable of operating with at least two different clock ratios, each clock ratio being associated by a different circuit to which the interface performs an interface function.

In optional step 130, the critical portion is designed with a power domain that is independent of the portion of the integrated circuit that is outside of the critical portion. A power domain can be designed consistent with a speed push plan, such that increased power leakage in the later-generation integrated circuit fabricated using a speed push process can be limited. Partitioning of power into different power domains can avoid power increases to parts of the integrated circuit that are outside of the critical portion and are more power sensitive than the critical portion.

In optional step 135, a marker layer is designed. The marker layer identifies the bounds of the critical portion. In an example, the marker layer can be provided for a plurality of circuits that can be speed push processed as a group. For example, there may be separate markers to identify speed pushed n- and p-channel transistors. Different marker layers can have unique marker layers for respective different types of speed push processes.

In optional step 140, a design rule check is performed to ensure that the marker layer meets a manufacturing requirement. This check includes ensuring that the market layer sufficiently covers a transistor layout that needs to be speed pushed, and has sufficient physical separation from a transistor layout that will not be speed pushed.

In optional step 145, the integrated circuit is designed to identify a type of speed push processing that is to be applied during fabrication. In an example, the speed push process is identified by blowing an on-chip fuse during fabrication. This allows a device integrated with the integrated circuit to detect a speed push process that was applied during fabrication of the integrated circuit, and accordingly configure the device's parameters.

In step 150, during fabrication, a performance boosting process is performed on a selected transistor within the critical portion.

Figure 2A:
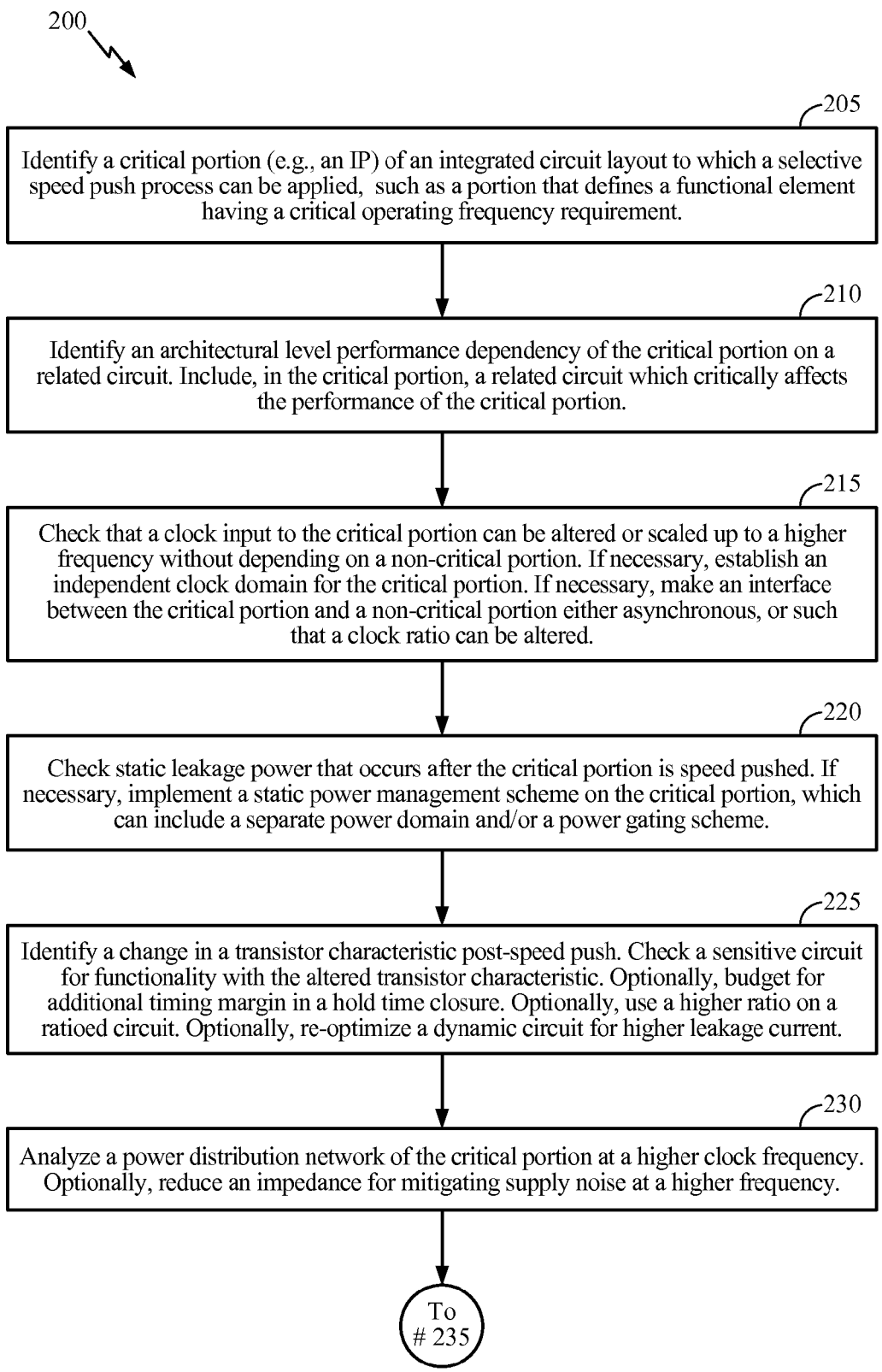
FIGS. 2A-B depict another flowchart of an exemplary method for designing an integrated circuit.
Figure 2B:
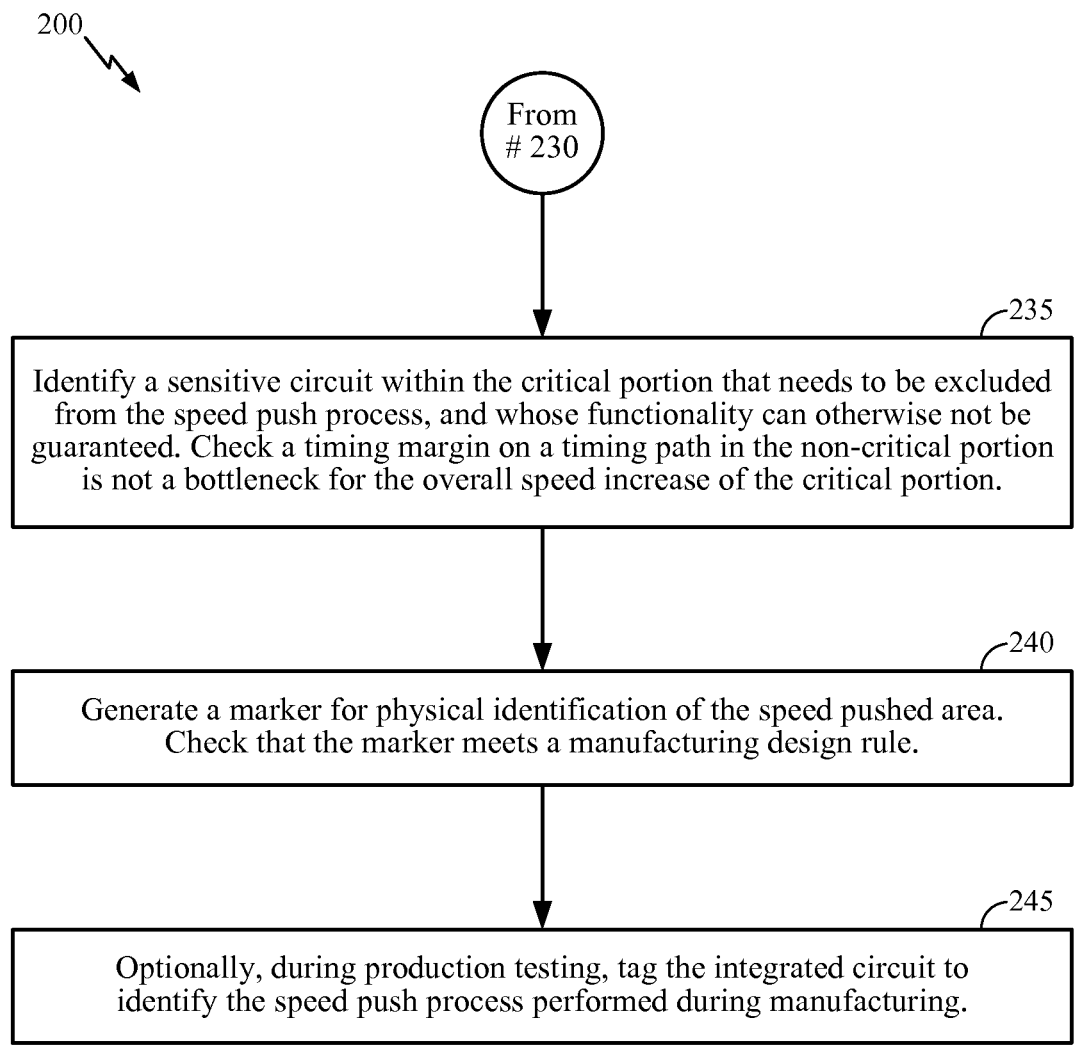

FIGS. 2A-B depict a flowchart of an exemplary method 200 for designing an integrated circuit that enables performance enhancement of later generations of the integrated circuit, without requiring redesign of the entire integrated circuit.

In step 205, a critical portion (e.g., an IP) of an integrated circuit layout to which a selective speed push process can be applied is identified.

In step 210, an architectural level performance dependency of the critical portion on a related circuit is identified. A related circuit that critically affects performance of the critical portion is included in the critical portion.

In step 215, a clock input to the critical portion is checked to determine if the clock input's frequency can be altered (e.g., scaled up) to a higher frequency without impacting a non-critical circuit portion. An independent clock domain can be established for the critical portion, if doing so is necessary to avoid the clock input impacting a non-critical circuit portion. An interface between the critical portion and a non-critical portion can designed so that the interface is either synchronous or such that a clock ratio between the critical portion and the non-critical portion can be altered.

In step 220, check static leakage power that occurs after the critical portion is speed pushed. If necessary, a static power management scheme is implemented for the critical portion, which can include powering the critical portion with a dedicated power domain and/or a power gating scheme.

In step 225, a change in a transistor characteristic post-speed push is identified. A sensitive circuit is checked for functionality with the altered transistor characteristic. Optionally, additional timing margin in a hold time closure is budgeted. A higher ratio can be implemented on a ratioed circuit. Further, a dynamic circuit can be re-optimized to handle a higher leakage current.

In step 230, a power distribution network of the critical portion is analyzed at a higher clock frequency. Optionally, an impedance for mitigating supply noise at a higher frequency is reduced.

In step 235, a sensitive circuit within the critical portion that needs to be excluded from the speed push process, and whose functionality can otherwise not be guaranteed, is identified. A timing margin on a timing path that traverses the border between critical and non-critical portions is checked. A timing path in the non-critical portion is ensured to not be a bottleneck for the overall speed increase of the critical portion.

In step 240, a marker for physical identification of the speed pushed area is generated. The marker is checked to meet a manufacturing design rule.

In step 245, optionally, during production testing, the integrated circuit is tagged to identify the speed push process performed during manufacturing.

Figure 3:
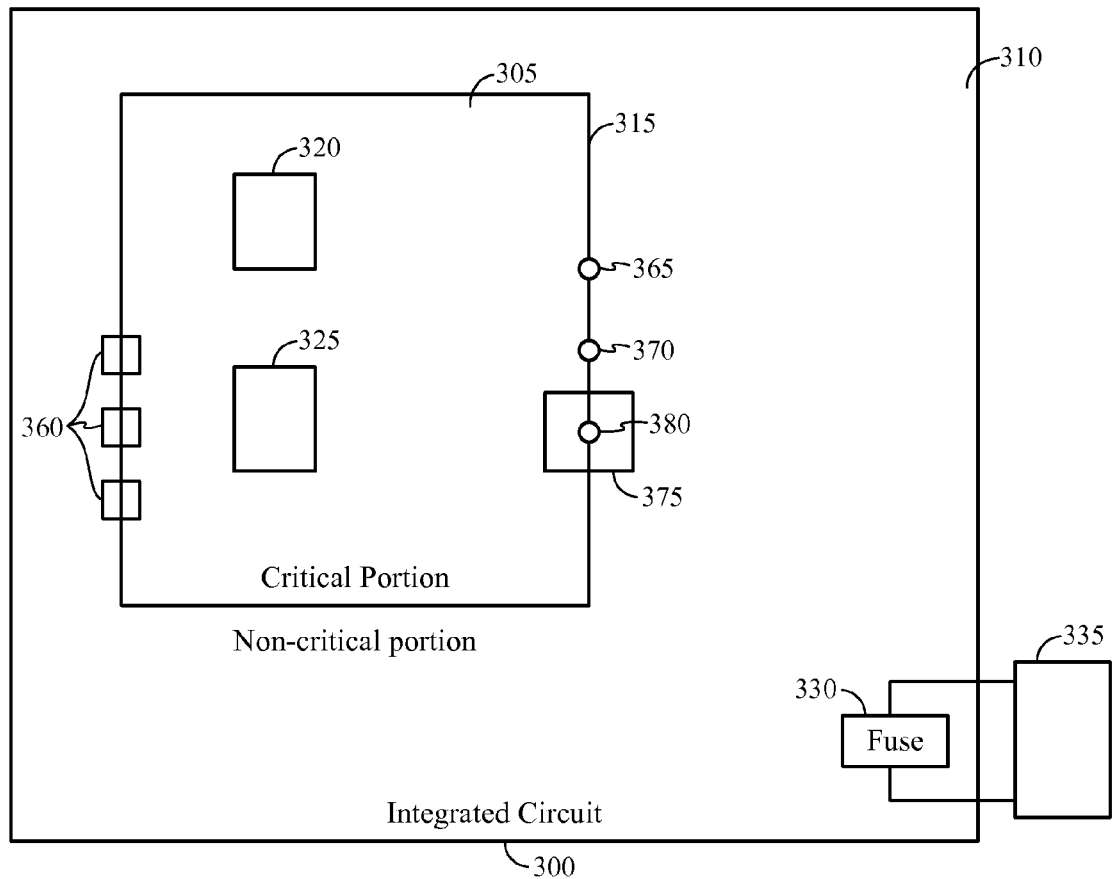
FIG. 3 depicts an integrated circuit configured to enable a push process.

FIG. 3 depicts an integrated circuit 300 configured to enable a push process. The integrated circuit 300 can be designed and/or fabricated using the techniques described herein. Further, the integrated circuit 300 includes a critical portion 305 and a non-critical portion 310 that are delineated by a boundary 315. In an example, the integrated circuit 300 is integrated with a mobile device (i.e., the integrated circuit 300 is coupled to a portion of the mobile device).

The critical portion 305 can include a critical portion power domain 320 that is configured as a power domain dedicated to powering a circuit located inside the critical portion 305. In an example, all transistors within the critical portion 305 can be powered by the same power supply. Voltage island techniques can be used to define multiple power domains in a region of the integrated circuit 300, such as the critical portion 305.

The critical portion 305 can also include a critical portion clock domain 325 that is configured as a clock domain that is dedicated to providing a clock signal to a circuit located inside the critical portion 305. In an example, all transistors within the critical portion 305 can be clocked with the same clock signal source. A circuit performing clock division and/or multiplication techniques can be used to supply multiple frequency domains in a region of the integrated circuit 300 (such as the critical portion 305) with their own respective clock. The critical portion power domain 320 and the critical portion clock domain 325 can be overlapping regions or can be separate regions. The non-critical portion 310 can include a fuse 330. The fuse 330 can be coupled to an external circuit 335. The fuse 330 can be intentionally blown during fabrication of the integrated circuit 300 to indicate to the external circuit 335 a type of push process performed on the integrated circuit 300 during fabrication of the integrated circuit 300. The external circuit 335 can be a portion of a mobile device and/or a device configured to test the integrated circuit 300. The external circuit 335 can also be coupled to the critical portion 305 and/or the non-critical portion 310. The integrated circuit 300 can also include a tangible marking indicating a type of speed push processing that is to be applied to the integrated circuit 300 during fabrication of the integrated circuit 300.

The boundary 315 can include a marker 360 in a marker layer for indicating the location of the boundary 315. In an example, the boundary 315 is the marker layer or defines vertices of a separate marker layer (e.g., the marker 360). Further, the boundary 315 can also include a clock supply node 365 for providing a clock signal across the boundary 315. The boundary 315 can also include a power supply node 370 for providing power across the boundary 315.

An interface 375 can be located across the boundary 315 between the critical portion 305 and non-critical portion 310. The interface 375 can be an asynchronous interface and/or capable of operating with at least two different clock ratios, each clock ratio being associated with a different circuit to which the interface performs an interface function. The interface 375 can include an interface node 380 for providing a signal across the boundary 315.

In some aspects, the teachings herein can be employed in a mobile device capable of supporting communication. For example, the teachings herein can be applied to a mobile device that is configured to use any one (or combinations) of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A mobile device employing the teachings herein can be designed to implement one or more standards, such as IS-95, cdma2000, IS-856, W-CDMA, TDSCDMA, and other standards. A CDMA network can implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM.®., etc. UTRA, E-UTRA, and GSM are part of Universal Mobile Telecommunication System (UMTS). The teachings herein can be implemented in a mobile device that is configured to use a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure can be described using 3GPP terminology, it is to be understood that the teachings herein can be applied to 3GPP (e.g., Re199, Re15, Re16, Re17) technology, as well as 3GPP2 (e.g., 1xRTT, 1xEV-DO RelO, RevA, RevB) technology and other technologies. The techniques can be used in a mobile device that is configured to use emerging and future networks and interfaces.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. A software module may reside in RAM memory, flash memory, ROM memory, EPROM memory, EEPROM memory, registers, hard disk, a removable disk, a CD-ROM, and/or any other form of storage medium known in the art. An exemplary storage medium can be coupled to the processor such that the processor can read information from, and write information to, the storage medium. In an alternative, the storage medium may be integral with the processor.

Further, many embodiments are described in terms of sequences of actions to be performed by, for example, elements of a computing device. Various actions described herein can be performed by specific circuits (e.g., application specific integrated circuits (ASICs)), by stored program instructions being executed by one or more processors, or by a combination of both. Additionally, the sequence of actions described herein can be embodied entirely within any form of computer-readable storage medium having stored therein a corresponding set of computer instructions that upon execution cause a processor to perform at least a part of the functions described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The disclosed devices and methods can be designed and can be configured into a computer-executable file that is in a Graphic Database System Two (GDSII) compatible format, an Open Artwork System Interchange Standard (OASIS) compatible format, and/or a GERBER (e.g., RS-274D, RS-274X, etc.) compatible format, which are stored on a computer-readable media. The file can be provided to a fabrication handler who fabricates with a lithographic device, based on the file, an integrated device. In an example, the integrated device is on a semiconductor wafer. The semiconductor wafer can be cut into a semiconductor die and packaged into a semiconductor chip. The semiconductor chip can be employed in a device described herein (e.g., a mobile device).

Nothing stated or illustrated herein is intended to cause a dedication of any component, step, feature, object, benefit, advantage, or an equivalent to the public, regardless of whether the component, step, feature, object, benefit, advantage, or the equivalent is recited in the claims.

While this disclosure describes exemplary embodiments of the invention, it should be noted that various changes and modifications can be made without departing from the scope of the invention as defined by the appended claims.

What is claimed is:

1. An integrated circuit, comprising:
    a critical portion, including a transistor, that is configured with a design that enables application of a speed push flow process to improve operating frequency of the critical portion; and
    a marker layer comprising and identifying the critical portion and
    a tangible marking indicating a type of speed push flow processing that was applied to the integrated circuit during fabrication of the integrated circuit.

2. The integrated circuit of claim 1, further comprising a mobile device with which the integrated circuit is integrated.

3. The integrated circuit of claim 1, further comprising a fuse that is configured to be coupled to a circuit external to the integrated circuit and that is blown to indicate the type of speed push flow process that has been performed on the integrated circuit.

4. The integrated circuit of claim 1, further comprising at least one of a power supply node, a clock supply node, or an interface node at a boundary between the critical portion and a portion of the integrated circuit that is outside of the critical portion.

* * * * *